Patented June 18, 1940

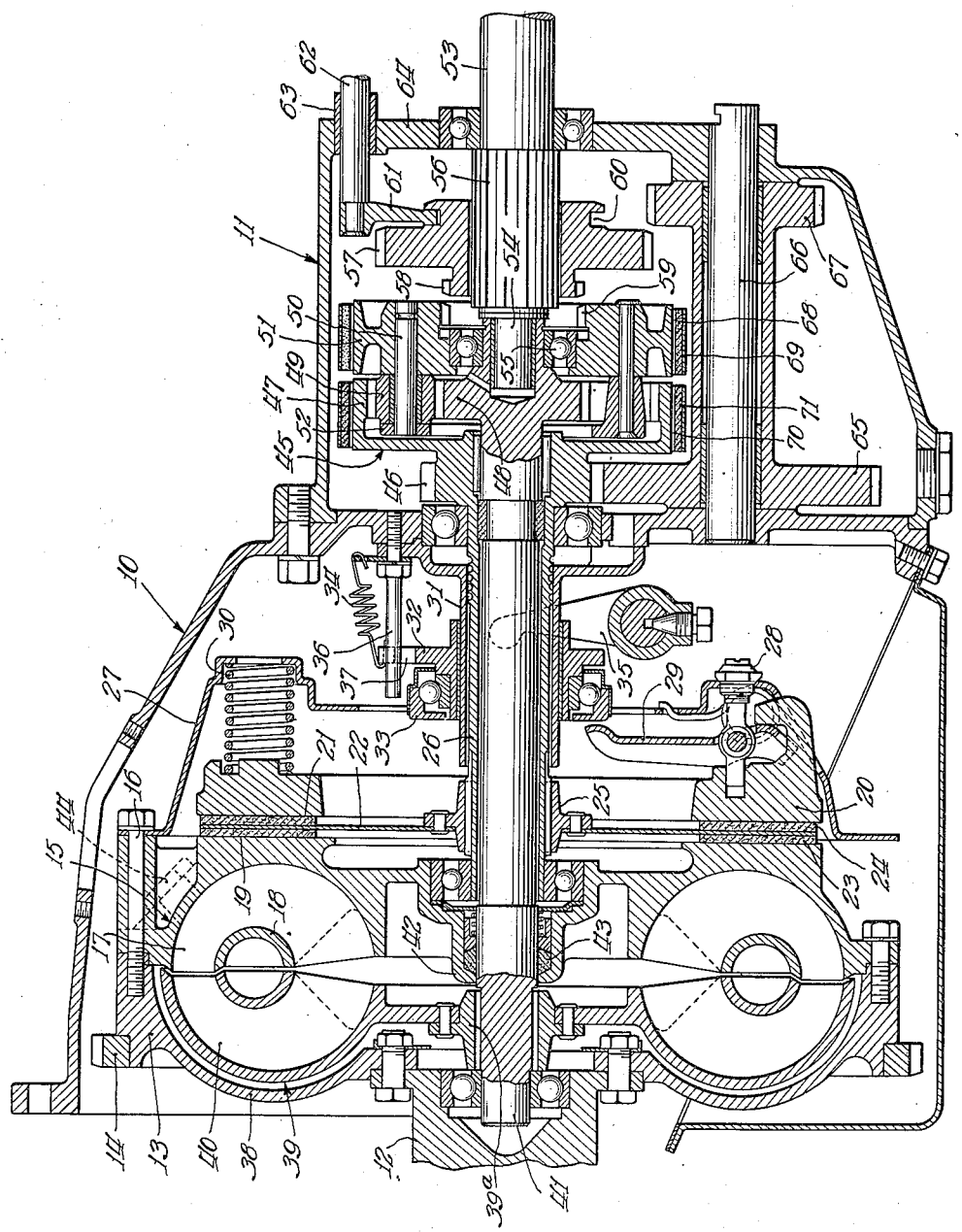

2,204,779

UNITED STATES PATENT OFFICE 2,204,779

TRANSMISSION

Benjamin A. Swennes, Rockford, Ill., assignor to Borg-Warner Corporation, Chicago, Ill., a corporation of Illinois Application May 16, 1938, Serial No. 208,099

7 Claims. (Cl. 74—189.5)

This invention relates to speed-changing mechanism, and particularly to such mechanisms as are used in automotive vehicles.

An object of this invention is to provide a speed-changing mechanism which employs a fluid coupling, the impeller of which is rigidly connected to the fly-wheel of the driving engine, with means for providing a definite neutral condition despite continuous rotation of the impeller of the fluid coupling.

Another object of this invention is a transmission using a fluid coupling in which two separate and selectable means are provided for conditioning the transmission for neutral operation.

Another object of this invention is a transmission having a fixed speed ratio gear train and an infinitely variable speed-reducing gear train, the infinitely variable gear train having a continuously driven fluid coupling.

Still another object of this invention is a transmission which is simple, compact, and which may be readily converted to automatic operation.

These and other objects of this invention will become apparent from the following detailed description when considered together with the accompanying drawing in which is shown an elevation in section of the transmission.

In its preferred form, this invention comprises a fly-wheel, one portion of which is vaned to form the impeller of a fluid coupling, and another portion of which is adapted to cooperate with a standard clutch disc to provide two paths of power. Two gear trains are provided, namely, a planetary gear train and a countershaft gear train, the first gear of the countershaft train and the ring-gear of the planetary gear train being driven simultaneously from the clutch disc through a sleeve. The sun-gear of the planetary gear train is driven by a runner, which cooperates with the impeller in the fly-wheel and forms the driven element of the hydraulic coupling. The planet gears of the planetary gear train are mounted on a gear carrier which is adapted to be clutched to the driven shaft. Brake means are provided for arresting the ring-gear or the planet carrier at the will of the operator to obtain different speed ratios. The countershaft train is a low speed train and is independent of the fluid coupling. The planetary speed train is the infinitely variable speed train, and derives its power from both the friction clutch and the fluid coupling.

Referring to the drawing now for a detailed description of the invention, the transmission may be divided into two main sections 10 and 11, section 10 comprising the coupling or clutching section, and section 11 comprising the gear train or speed reducing section.

The clutching section 10 comprises a driving shaft 12 to which is bolted a fly-wheel 13 supporting the usual starting ring-gear 14. Contributing to the inertia of the rotating fly-wheel is an impeller 15 which is secured to fly-wheel 13 by means of bolts 16. Impeller 15 is provided with curved blades 17 and a portion of a toroidal wall 18, which defines a passageway for the fluid to be used therewith.

The right-hand portion of impeller 15 has a friction surface 19, which is normal to the axis of rotation of driving shaft 12. Opposed to friction surface 19 is a pressure plate 20 having a friction surface 21 facing friction surface 19 on impeller 15. Between friction surfaces 19 and 21 is a friction disc 22 having clutch facings 23 and 24 adapted to cooperate with friction surfaces 19 and 21, respectively. Friction disc 22 is riveted to a collar 25, which is splined to a long hollow shaft 26. A clutch cover 27 is bolted to impeller 15 by means of bolts 16, said clutch cover 27 carrying the usual studs 28 and clutch throw-out fingers 29 for actuating pressure plate 20 against the force of compression springs 30.

A fixed sleeve 31 which is coaxial with sleeve 26 supports an axially slidable clutch throw-out collar 32. Said collar 32 engages, through a thrust ball-bearing race 33, the inner ends of clutch throw-out fingers 29. A tension spring 34 holds collar 32 against a pivoted yoke 35, which is adapted to be oscillated by a standard pedal (not shown). A pin 36 which is fixed, extends through an aperture 37 in collar 32 to prevent said collar from turning, and thereby makes one spring 34 suffice to hold said collar 32 against fork 35.

The forward end 38 of fly-wheel 13 is hollowed to receive a runner 39 which cooperates with impeller 15 to form a fluid coupling. Said runner 39 is provided with vanes 40 which receive the fluid from vanes 17 of impeller 15, and after removing the greater portion of the energy from the fluid, redirect said fluid to impeller 15.

Said runner 39 is secured to a collar 39a, which is splined to the end of a shaft 41. The inner end of impeller 15 is formed into a gland 42 having packing material 43 to prevent the fluid of the hydraulic coupling from escaping from the coupling. A threaded plug 44 is provided to permit the fluid for the coupling to be poured thereinto.

It is apparent thus far that friction clutch disc 22 will drive sleeve 26, and runner 39 of the fluid coupling will drive shaft 41. The energy in sleeve 26 and shaft 41 is utilized in the gear section 11 as follows:

Sleeve 26 terminates in gear section 11 in a composite internal-external gear 45, which for the sake of simplicity of description will be considered as two separate gears 46 and 47 respectively. In a similar manner, shaft 41 terminates in a single gear 48. Internal gear 47 constitutes the orbit or ring-gear of the planetary gear train, and gear 48 constitutes the sun-gear. Cooperating with ring-gear 47 and sun-gear 48 are a plurality of planet gears 49, each of said planet gears being rotatably mounted on individual shafts 50, which are supported by a carrier 51. A ring 52, which is threaded over the ends of shafts 50, is secured to carrier 51 and relieves planet gear shafts 50 of the greater portion of bending stresses imposed thereon by the planet gears. The driven shaft 53 extends into section 11, and is piloted at 54 in the right-hand end of shaft 41. Said right-hand end of shaft 41 likewise supports a ball-bearing 55, which in turn supports and centers carrier 51.

The greater portion of shaft 53 included in section 11 is splined as at 56, said splines 56 cooperating with internal splines in a sliding gear 57, so that said gear and shaft rotate together. The left-hand end of gear 57 is provided with external teeth 58, which are adapted to cooperate with internal teeth 59 on carrier 51 to form a jaw clutch. To the right of gear 57 is an annular groove 60 into which is fitted a fork 61. A shift rod 62 is connected at one end to shift fork 61, and is journalled in a bearing 63 in wall 64 of section 11.

Cooperating with gear 46 is a gear 65 which is mounted on a countershaft 66. A second gear 67 is mounted on countershaft 66 for rotation with gear 65. Said gear 67 is adapted to mesh with gear 57 on driven shaft 53.

Thus, gear 57, when moved to its extreme left-hand position, acts as a clutch to connect carrier 51 with driven shaft 53, and when moved to its extreme right-hand position, meshes with gear 67 to drive shaft 53 from gear 67 at a reduced speed. An intermediate position is provided in which neither carrier 51 nor gear 67 is engaged to provide a neutral position for the transmission.

It is characteristic of planetary transmissions that if the carrier is held against rotation, and one of the other gears is driven, the remaining gear will rotate in a direction opposite to that of the driven gear. This characteristic is employed in the transmission of this invention to obtain reverse drive, and accordingly carrier 51 is provided with a cylindrical surface 68 and a brake band 69, which when tightened upon surface 68, holds carrier 51 against rotation. The gear train associated with the carrier to give reverse will be described later.

It is also a characteristic of a planetary gear train that if the ring-gear is held against rotation, and the sun-gear is driven, the carrier will rotate at a reduced speed. This feature is likewise employed in the present transmission, and to that end ring-gear 47 is provided with a cylindrical surface 70, which is adapted to cooperate with a brake band 71, which when tightened will hold ring-gear 47 against rotation. The gears associated with the braked ring-gear to give a reduced speed will be detailed below.

The operation of the transmission is as follows:

The transmission can be conditioned for neutral operation in one of two ways. First, sliding gear 57 can be placed in its intermediate position in which case driven shaft 53 is entirely free of driving connection with the remainder of the transmission. Second, this result can be obtained even though gear 57 is clutched to carrier 51, simply by releasing clutch disc 22 and the brake band 71 on ring-gear 47. With these members released, the rotation of the engine and fly-wheel 13 may impart driving torque to runner 40 and shaft 41, but since ring-gear 47 and clutch disc 22 are released, the driving torque is dissipated through pinions 49 and ring-gear 47. In other words, the resistance to motion of the car will hold carrier 51 stationary, and the driving torque in sun gear 48 will then merely rotate pinions 49 about their shafts 50, there being no resistance presented by ring-gear 47 to the rotation of the pinion, since it is free to rotate by virtue of the release of clutch disc 22 and brake band 71.

To start the car, that is, to impart driving torque to driven shaft 53, sliding gear 57 is shifted to its extreme left-hand position, so that it is in driving relation to carrier 51. With clutch disc 22 still released as in the neutral position, brake band 71 is tightened on ring-gear 47, and the drive is then imparted from fly-wheel 13 through the hydraulic coupling, shaft 41, sun-gear 48, planet pinion 49 and carrier 51 to jaw clutch 58—59 and the driven shaft 53.

All intermediate ratios between this low ratio and direct drive are then secured by releasing brake band 71 and engaging clutch disc 22. The drive is imparted to the driven shaft through two paths, one of which comprises fly-wheel 13, clutch disc 22, ring-gear 47, pinion 49 and carrier 51, and the other of which comprises fly-wheel 13, runner 39, shaft 41, sun-gear 48, pinion 49, carrier 51 and shaft 53. The load will be shared in equal proportion between the two paths because of the differential effect between the sun-gear and the ring-gear of the planetary gear train.

To obtain a positive and still lower ratio speed reduction, sliding gear 57 is placed in its extreme right-hand position, wherein it engages gear 67 on countershaft 66. With both brake bands released, the drive is then from fly-wheel 13 through clutch disc 22, gear 46, gear 65 on countershaft 66, gear 67, gear 57 to driven shaft 53.

Although the impeller may be rotating and driving the runner at the same time that the transmission is conditioned for positive low ratio, such torque as is developed is dissipated through sun-gear 48, planet gear 49, and freely rotating carrier 51.

Reverse is obtained with the transmission conditioned as for positive low gear except that clutch disc 22 and brake band 71 are released to permit ring-gear 47 to rotate, and brake band 69 is tightened on carrier 51 to prevent its rotation. Reverse drive is then effectuated from fly-wheel 13 through impeller 15, runner 39, shaft 41, sun-gear 48, planet gear 49 (rotating on stationary shaft 50) reversely rotating ring-gear 47, gear 46, gear 65 on countershaft 66, gear 67, and gear 57 to driven shaft 53.

The clutch pedal for operating yoke 35, the brake band tightening means, and the means for shifting rod 62 axially have not been shown in detail, since such means are well known in the art and may take any desirable form.

It is apparent that the above described transmission will give several forward speeds, and a neutral position without shifting any gears, and hence lends itself readily to automatic operation. Since gear shifting is eliminated for forward speed ratios, the operation of the transmission is silent and smooth. The use of the hydraulic coupling enables the transmission to absorb shocks and vibrations from the engine, and hence increases the smoothness of operation of the device.

The friction clutch employs standard parts, that is, parts which are in common use at the present time, and hence it can be made relatively inexpensive. The gear section 11 employs very few gears for the variety of speed permitted.

It is understood that the foregoing description is merely illustrative of a preferred embodiment of the invention, and that the scope of the invention, therefore, is not to be limited thereto, but is to be determined by the appended claims.

I claim:

1. A speed ratio changing device comprising a friction clutch, a fluid coupling, unitary means for driving both said clutch and said coupling, a planetary gear train, one element of said train being connected to rotate with the fluid coupling, another element of said train being connected to rotate with the friction clutch, a driven shaft, means for connecting at will the third element of said train to the driven shaft, brake means for said second-mentioned element, and means for releasing said friction clutch, whereby neutral may be obtained with the fluid coupling connected to the driving means and the third element of the planetary gear train connected to the driven shaft.

2. A speed ratio changing device comprising a drive shaft, a fluid coupling including an impeller and a runner, said impeller being connected to said drive shaft, a releasable friction clutch having driving and driven elements, said driving element being also connected to said drive shaft, a planetary gear train, one element of said train being connected to the fluid coupling and another element being connected to the friction clutch, a countershaft gear train, one gear of said countershaft gear train being connected to rotate with the second-mentioned element of the planetary gear train, a driven shaft, and means for connecting either the countershaft gear train or the planetary gear train to the driven shaft.

3. A speed ratio changing device comprising a planetary gear set including a sun-gear, planet pinions, a carrier for the planet pinions and a ring-gear, driving and driven shafts, a gear rotating with the ring-gear, a countershaft, a gear on said countershaft meshing with the gear rotating with the ring-gear, a second gear on the countershaft and rotatable with the said countershaft gear, a releasable connection between the ring-gear and the driving shaft, a slidable gear on the driven shaft, clutch teeth on said gear, clutch teeth on said carrier, said slidable gear being shiftable to mesh with the second countershaft gear, and means for holding the carrier against rotation, whereby to obtain a reverse drive through the device when the connection between the ring-gear and the driving shaft is released and the slidable gear is in mesh with the second countershaft gear.

4. A speed ratio changing device comprising a planetary gear set including a sun-gear, planet pinions, a carrier for the planet pinions and a ring-gear, driving and driven shafts, a releasable connection between the ring-gear and driving shaft, a fluid connection between the sun-gear and driving shaft, a gear rotatable with the ring-gear, a countershaft, a gear rotatable with the driven shaft, gears on the countershaft, one of said gears being in mesh with the gear rotatable with the ring-gear and another being adapted to mesh with the gear rotatable with the driven shaft, a releasable jaw clutch for connecting the carrier with the driven shaft gear, and means for holding the carrier against rotation for reverse drive, said holding means and jaw clutch when released conditioning the device for positive low speed drive.

5. A speed ratio changing device comprising a planetary gear set including a sun-gear, planet pinions, a carrier for the planet pinions and a ring-gear, driving and driven shafts, a releasable connection between the ring-gear and driving shaft, a fluid connection between the sun-gear and driving shaft, a gear rotatable with the ring-gear, a countershaft, a gear rotatable with the driven shaft, gears on the countershaft, one of said gears being in mesh with the gear rotatable with the ring gear and another of said gears being adapted to mesh with the gear rotatable with the driven shaft, a releasable jaw clutch for connecting the carrier with the driven shaft gear, releasable means for holding the ring gear against rotation, and releasable means for holding the carrier against rotation, said countershaft gears forming a part of a low speed gear train when the jaw clutch and carrier holding means are released, and said countershaft gears forming a part of a reverse gear train when said jaw clutch, ring-gear and releasable connection are released and the carrier is held against rotation.

6. A speed ratio changing device comprising driving and driven shafts, a fly-wheel mounted on the driving shaft and rotatable therewith, a fluid coupling within said fly-wheel and comprising an impeller driven by the fly-wheel and a runner, an intermediate shaft on which the runner is mounted, a hollow shaft surrounding the intermediate shaft, a friction clutch connecting the hollow shaft to the fly-wheel, a sun-gear mounted on the intermediate shaft, an external gear and a ring-gear mounted on the hollow shaft, planet pinions meshing with the sun and ring-gears, a carrier for the planet pinions, a gear slidably mounted on the driven shaft, clutch teeth on said slidable gear, corresponding clutch teeth on the carrier, a countershaft, gears on said countershaft, one of said countershaft gears meshing with the external gear on the hollow shaft and another of said gears being adapted to mesh with the slidable gear on the driven shaft and releasable holding means for the ring-gear and planet carrier, whereby said device may be conditioned for low speed by releasing the friction clutch, holding said carrier and engaging said jaw clutch, or by releasing the holding means, engaging the friction clutch, releasing the jaw clutch and meshing the slidable gear with the countershaft gear, and said device may be conditioned for reverse drive by releasing the friction clutch, disengaging the jaw clutch, meshing the slidable gear with the countershaft gear, holding the carrier and releasing the ring-gear.

7. A speed ratio changing device comprising a friction clutch, a fluid coupling, unitary means for driving both said clutch and said coupling, a planetary gear train, one element of said train being connected to rotate with the fluid coupling, another element of said train being connected to rotate with the friction clutch, a driven shaft, means for connecting the third element of said train to the driven shaft, brake means for said second-mentioned element, and means for releasing said friction clutch, whereby neutral may be obtained with the fluid coupling connected to the driving means and the third element of the planetary gear train connected to the driven shaft.

BENJAMIN A. SWENNES.